United States Patent [19]

Novak et al.

[11] 4,233,362

[45] Nov. 11, 1980

[54] WATER-SOLUBLE AIR-OXIDIZING ACRYLIC COATINGS

[75] Inventors: Ronald W. Novak, Hatfield; Benjamin B. Kine, Elkins Park, both of Pa.

[73] Assignee: Rohm and Haas Company, Philadelphia, Pa.

[21] Appl. No.: 970,717

[22] Filed: Dec. 18, 1978

Related U.S. Application Data

[63] Continuation-in-part of Ser. No. 783,587, Mar. 1, 1977, abandoned, which is a continuation-in-part of Ser. No. 751,507, Dec. 17, 1976, abandoned.

[51] Int. Cl.$^2$ ............... B05D 3/02; B32B 17/10; B32B 19/04; B32B 15/08
[52] U.S. Cl. ............... 428/332; 427/389.7; 427/393.5; 427/393.6; 427/388.4; 427/389.8; 525/329; 525/374; 260/29.6 HN; 260/296 AT; 427/389; 427/392; 428/442; 428/443; 428/463; 428/507; 526/16; 526/49; 526/328
[58] Field of Search ............... 260/29.6 HN, 29.6 AT; 427/385 R, 388 C, 385 A, 385 B, 385 C, 390 A, 392, 389; 526/16, 49, 328; 428/332, 442, 443, 463, 507

[56] References Cited

U.S. PATENT DOCUMENTS

| | | | |
|---|---|---|---|
| 3,098,760 | 7/1963 | Ericks | 427/382 |
| 3,261,796 | 7/1966 | Simons | 260/29.6 |
| 3,356,627 | 12/1967 | Scott | 260/29.6 |
| 3,528,939 | 9/1970 | Pratt et al. | 260/296 |
| 3,590,016 | 6/1971 | Hopwood | 260/29.6 |
| 3,759,915 | 9/1973 | Kottke | 526/16 |

*Primary Examiner*—Michael R. Lusignan

[57] ABSTRACT

The specification discloses a polymer and the method of using the same to prepare articles of manufacture, the composition comprising a water-soluble salt of a polymer containing pendant groups derived from an unsaturated drying oil fatty acid hydroxyamide, carboxy groups, carboxy ester groups and optionally the residues of other unsaturated addition polymerizable monomers, the carboxy units being present in a critical amount and the polymer having a critical glass transition temperature, molecular weight and the like. Aqueous coating compositions are disclosed in which the soluble polymer is either the sole polymeric vehicle or is combined with a water-insoluble polymer latex.

26 Claims, No Drawings

WATER-SOLUBLE AIR-OXIDIZING ACRYLIC COATINGS

This application is a continuation-in-part of application Ser. No. 783,587, filed Mar. 1, 1977, abandoned, which in turn was a continuation-in-part of Ser. No. 751,507, filed Dec. 17, 1976, abandoned.

The invention concerns a polymer and the method of using the same to prepare articles of manufacture, the composition comprising a water-soluble salt of a polymer containing pendant groups derived from an unsaturated drying oil fatty acid hydroxyamide, carboxy groups, carboxy ester groups and optionally the residues of other unsaturated addition polymerizable monomers, the carboxy units being present in a critical amount and the polymer having a critical glass transition temperature, molecular weight and the like. The groups derived from the hydroxyamide have the structure of formula V given below.

The soluble polymer is used in aqueous coating compositions, one utility being as the sole vehicle. Another use of the soluble polymer is in aqueous latex points in which a large part of the vehicle is the water insoluble polymer of the latex.

In the past, similar polymers have been known for coatings and for other utilities such as putty-like caulking compositions. The caulking compositions are shown in Kottke U.S. Pat. No. 3,759,915 whereas the coating compositions are shown in Hopwood et al U.S. Pat. No. 3,590,016. This invention is basically an improvement upon the Hopwood et al patent. In that patent, as in the present application, the polymers contain an acrylic backbone having pendant carboxy units, post-reacted in the preferred embodiment with N-hydroxyalkylamides. In the Hopwood et al. patent, the acid moiety of the hydroxyamide can be saturated or unsaturated, and the polymers disclosed in the examples are exceptionally brittle, having a high glass transition temperature ($T_g$). The polymer of the patent can be water-soluble or water-insoluble. Salts of the polymer containing carboxyl groups, disclosed in the patents can be neutralized with ammonia, certain amines, or bases, including ones inoperable according to the present invention, when a metal drier salt is utilized in accordance with the invention. Problems encountered with the polymers include the formation of gel, poor gloss when dried under high humidity conditions, slow development of block resistance, and unstable dispersions.

It has now been found that certain parameters and features of the polymer are critical for utilization of the polymer as a water-soluble air-curing material. The finished coating must have a $T_g$ of below 80° C. preferably about 65° C., more preferably below 60° C. The calculated $T_g$ of the prepolymer or backbone polymer, before esterification by the hydroxyamide to give units of Formula V, infra, should be below about 50° C., although it can be up to 85° C., if large quantities of the amide are present.

The polymer has the structure:

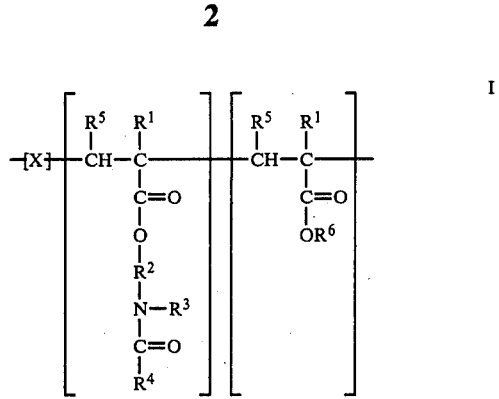

wherein
$R^1$ is H, a lower alkyl radical having one to five carbon atoms, halogen, —CN, or —$CH_2COOR$, —COOR, or —$CH_2COOH$, R being a lower alkyl radical having from one to eight carbon atoms;

$R^2$ is $(CR^7{}_2)_n$ wherein $R^7$ is —H or —$CH_3$ and n is 1 or 2; and where $R^2$ is —$CH_2CH_2$—, Formula V given below may be designated Formula Va;

$R^3$ is H, or a lower alkyl radical having from one to 8 carbon atoms;

$R^4$ is an unsaturated, air-curable alkyl radical;

$R^5$ is H, —COOH, —$CONH_2$, or —COOR, wherein R is as above;

$R^6$ is H, or an aliphatic or cycloaliphatic radical having from one to 20 carbon atoms; and X is optional and when present is derived from at least one vinyl monomer different than the residues depicted;

the units in brackets being in any order, portions of the $R^6$ radicals, in units of the formula:

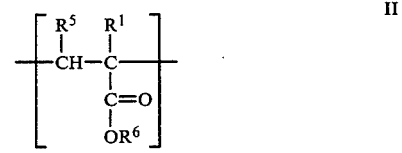

being H in a sufficient number of units of Formula II to provide the polymer with a carboxy content of 0.5–6 meq/g. of polymer, the quantity of carboxy groups being sufficient, when in the form of salt groups with said amine or ammonia, to confer water solubility upon the polymer, the amount of carboxy-containing units of Formula II wherein $R^6$ is H being between 5 and 40 parts by weight of the total polymer. Preferably a portion of the radical $R^6$ in the units of Formula II is at least one aliphatic or cycloaliphatic radical whereby said portion of the units of Formula II is derived from at least one ester which when homopolymerized gives a polymer having a $T_g$ of between −80° C. and 120° C., said ester units forming up to 90 parts by weight of the polymer; the polymer having between about 5 and 60 parts, preferably between about 10 and 40 parts by weight of units of the formula:

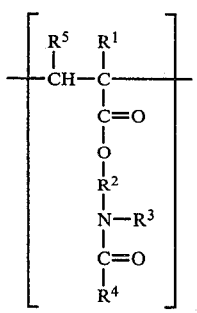

V

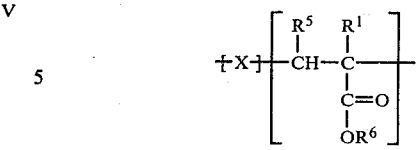

III and the fatty acid amide has the formula:

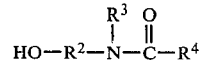

IV wherein the symbols used have the same meaning as given above.

Preferred compositions contain polymer units of:
(a) 0–50, preferably 10–50 parts by weight of a monomer selected from esters of acrylic acid or methacrylic acid, which when homopolymerized gives a polymer having a $T_g$ of between about 0° C. and −80° C., preferably below −10° C.
(b) 20–70 parts by weight of a monomer selected from esters of acrylic acid or methacrylic acid, vinyl aromatic hydrocarbons and unsaturated nitriles which when homopolymerized gives a polymer having a $T_g$ between about 20° C. and 120° C., preferably between about 50° C. and 120° C.
(c) 5–30, preferably 5–20, more preferably 8–15 parts of an ethylenically unsaturated carboxylic acid, optionally with up to 30, preferably 0–20 parts of a different ethylenically unsaturated monomer which confers hydrophilicity to the polymer and enhances its solubility in aqueous liquids, the quantity of ethylenically unsaturated acid being between about 0.6 and 4.5 preferably from 0.6 to 2.5 meq/g. of polymer, and
(d) 10–50, preferably 15–50 parts by weight of units of Formula V, and the total of (a), (b), (c), and (d) being 100.

Still more preferably, the polymer is one wherein:
(a) is selected from one or more of ethyl acrylate, butyl acrylate, 2-ethylhexyl acrylate, sec-butyl acrylate, isobutyl acrylate, and isopropyl acrylate,
(b) is selected from one or more of methyl methacrylate, styrene, ethyl methacrylate, acrylonitrile, butyl methacrylate, isobutyl methacrylate, and vinyl toluene,
(c) is selected from one or more of acrylic acid, methacrylic acid, maleic acid, and itaconic acid, and is present in an amount of from 8 to 20 parts, optionally with up to 20 parts of one or more of the hydrophilic monomers, hydroxyethyl or hydroxypropyl (meth)acrylate (i.e., acrylate or methacrylate), and
(d) is present in the amount of between about 20 and 50 parts, the polymer consisting essentially of (a), (b), (c), and (d), and in which the $\overline{M}v$ is between about 10,000 and 200,000, preferably 20,000 and 80,000, and more preferably between about 30,000 and 50,000.

In a preferred polymer, in Formula V, n is 2, $R^3$ is —H, —CH$_3$, or —CH$_2$CH$_3$, and $R^4$ is the residue of one or more of the drying oil acids selected from tung oil acids, linseed oil acids, dehydrated castor oil acids, safflower oil acids, conjugated safflower oil acids, soybean oil acids and oiticica oil acids. An especially prewherein $R^1$, $R^2$, $R^3$, $R^4$, and $R^5$ are as identified above, any balance of the polymer being the units of —X— of addition polymerized ethylenically unsaturated monomers other than said units of Formulas II and V, the total parts of all said units being 100, the $\overline{M}v$ of the polymer being between about 5,000 and 200,000, the $T_g$ of a cured film of the polymer being between about −20° C. and 80° C., the Tukon Hardness of the cured film being between about 0.2 and about 15, in which the composition optionally includes a metal compound drier in an amount up to 0.5%, on a metal basis, of the total polymer weight in the composition, applying a coating of the solution to a substrate, and drying and curing said coating in the presence of air. Preferably, the coating is from 0.1 mil to 10 mils in thickness, when dry.

The unit X is derived from at least one other optional copolymerizable vinyl monomer (defined hereinbelow) other than the one or ones from which the right hand group in brackets of Formula II is derived. It is to be understood that when $R^1$ and/or $R^5$ contain free carboxy groups (—COOH), the hydroxyamide will react therewith to give pendant ester groups equivalent to the structure of Formula V.

Examples of $R^1$ and $R^5$ are:

| $R^1$ | $R^5$ | Acid for Carboxyl Source |
|---|---|---|
| H | H | Acrylic |
| CH$_3$ | H | Methacrylic |
| H | COOH | Maleic, fumaric |
| H | CONH$_2$ | Maleamic |
| Cl | COOH | Chloromaleic |
| CH$_2$COOCH$_3$ | H | Methyl acid itaconate |
| CH$_2$COOH | H | Itaconic |
| CH$_2$COOH | COOH | Aconitic |
| H | COOCH$_3$ | Half ester of maleic |

The matter in the right hand bracketed group of Formula I or Formula III, represents that portion of the addition polymerized polymer backbone having free carboxyl groups as well as carboxyl groups which are esterified by the various alcohols conventionally used. The optional portion —X—, is derived from any of the well-known unsaturated addition polymerizable vinyl monomers, defined below, in addition to those which give units of Formula II above.

The backbone polymer, before esterification by the hydroxyamide, has the formula:

ferred combination of unsaturated drying oil acids are 50-90% of the acids of dehydrated castor oil, safflower oil, conjugated safflower oil, or soybean oil mixed with 10-50% by weight of the acids from tung oil.

It is possible to utilize a single acrylate or methacrylate ester, there being no necessity to use a combination if the suitable hardness and glass transition temperature can be obtained otherwise. An example of a polymer of this type is one which contains polymerized units consisting essentially of:

(a b) 45-90 parts by weight of butyl methacrylate
(c) 5-15 parts of an ethylenically unsaturated carboxylic acid, the quantity of ethylenically unsaturated acid being between about 0.6 and 2.5 meq/g. of polymer, optionally with up to 20 parts of a different ethylenically unsaturated monomer which confers hydrophilicity to the polymer and enhances its solubility in aqueous liquids, and
(d) 10-50 parts by weight of units of Formula V, and the total of (b), (c), and (d) being 100.

The backbone polymer, prior to esterification with the hydroxyamide, is a water-insoluble vinyl polymer containing the requisite proportion of carboxyl (—COOH) groups as described herein. The backbone polymers per se are well known in the art and form no part of the present invention.

The proportions of monomers in the backbone are such that there is at least 5% and no more than 30%, preferably less than 15%, of unsaturated carboxylic acid, by weight, of the monomers polymerized to give units of Formula II wherein $R^6$ is —H. An especially preferred range is from about 8% to 15%, and the optimum is considered to be in the range of 10% to 12%. It is essential to have a substantial proportion of free carboxyl groups for proper adhesion and, for maximum long term flexibility, a minimum of the drying oil functionality, particularly in cases where the soluble polymer is the predominant vehicle. Higher proportions of the drying oil moiety are preferred when the soluble polymer is present in a minor amount of the total polymeric vehicle in a latex paint.

The preferred backbone polymers are those of vinyl addition polymer type, including as an essential component the $\alpha, \beta$-unsaturated carboxylic acid, preferably acrylic acid or methacrylic acid. Other useful copolymerizable acids are named in U.S. Pat. Nos. 3,098,760 and 3,261,796, additional examples being given below.

To amplify, the unsaturated carboxylic acid may be a simple monocarboxylic acid, a polycarboxylic acid, or may be a partial ester or half amide of such $\alpha, \beta$-unsaturated polycarboxylic acids, and salts thereof with a volatile base such as ammonia, or with a volatile monamine, which form water-soluble salts with the copolymer acid, such as dimethylamine, triethylamine, diethanolamine, triethanolamine, morpholine, N-methyl morpholine, picoline, and the like, but not polyamines, which may interact with the metal of the siccative. Examples of copolymerizable ethylenically unsaturated monocarboxylic or polycarboxylic acids are sorbic, acryloxyacetic, acryloxypropionic, cinnamic, vinyl furoic, $\alpha$-chlorosorbic, methacryloxypropionic, methacryloxyacetic, p-vinylbenzoic, acrylic, methacrylic, maleic, fumaric, aconitic, atropic, crotonic, and itaconic acids, or mixtures thereof, with itaconic acid and the $\alpha$ $\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconic, butyl acid itaconate, methyl acid fumarate, butyl acid fumarate, methyl acid maleate and butyl acid maleate. Such partial esters, as well as partial amides, are considered to be "$\alpha$ $\beta$-unsaturated monocarboxylic acids," and the term as used herein includes such esters and amides.

The term "vinyl monomer" as used herein means a monomer comprising at least one of the following groups:

| vinylidene | $CH_2=C<$ |
| vinyl | $CH_2=CH-$, and |
| vinylene | $-CH=CH-$, | whether homopolymerizable or not, giving units corresponding to X and to Formula II. Examples are the $\alpha,\beta$-ethylenically unsaturated monocarboxylic acids and esters and amides thereof, $\alpha$ $\beta$-ethylenically unsaturated aldehydes, $\alpha,\beta$-ethylenically unsaturated dicarboxylic acids and esters, amides, half esters, and half amides thereof, $\alpha,\beta$-ethylenicaly unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof, whether homopolymers or copolymers. The vinyl backbone polymers and methods for their preparation form no part of the present invention, and any such polymer may be treated in accordance with the present invention. For examples of well-known vinyl polymers and methods of preparing the same, see "Polymer Processes," Schildknecht, Interscience, N.Y. (1956), pp. 111-174. Mixtures of different polymers are useful.

Specific examples of suitable monomers which may be copolymerized to obtain the water-insoluble polymers for use according to the invention in addition to the unsaturated acid monomers and esters thereof with alkanols having one to 20 carbon atoms, such as methanol, ethanol, butanol, pentadecanol and the like, are acrolein, methacrolein, ethylene, propylene, isobutene, butadiene, isoprene, chloroprene, styrene, vinyl toluene, vinyl methyl ether, vinyl isobutyl ether, vinyl chloride, vinyl bromide, vinylidene chloride, vinyl sulfide, vinyl acetate, vinyl propionate, the vinyl pyridines; primary amino compounds such as $\beta$-aminoethyl vinyl ether, aminopentyl vinyl ether; secondary amino-containing compounds such as t-butylaminoethyl methacrylate; tertiary amino containing compounds such as dimethylaminoethyl methacrylate, and the allied amine salts such as the chloride or hydroxide, and ureido monomers such as are disclosed in U.S. Pat. No. 3,356,627 to Scott. Copolymers and graft, block, or segmented polymers are included. Conventional methods of obtaining the backbone polymers are utilized.

As is described below, these vinyl monomers include the acids mentioned above and esters thereof, as well as known "soft" and "hard" monomers.

Another of the essential monomers, in addition to the acid monomer, usually utilized in a substantial proportion to prepare the backbone polymer, is a resiliency-imparting or soft monomer which may be represented by the following formula:

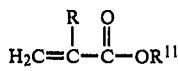

wherein R is H or alkyl having 1 to 4 carbon atoms and $R^{11}$ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxymethyl, cyclohexyl, n-hexyl, isobutyl, ethylthiaethyl, methylthiaethyl, ethylthiapropyl, n-octyl, 6-methynonyl, decyl, dodecyl, and the like, said radicals $R^{11}$, when alkyl, having from two to about 14 carbon atoms, preferably from three to 12 carbon atoms, when R is H or methyl, When R is alkyl and $R^{11}$ is alkyl, $R^{11}$ should have from about 6 to about 14 carbon atoms and when R is H and $R^{11}$ is alkyl, $R^{11}$ should have from about two to about 12 carbon atoms, in order to qualify as a soft monomer.

Other ethylenically unsaturated copolymerizable vinyl monomers, the homopolymers of which have a much higher $T_g$, are used in combinations with the above mentioned soft monomers provided they do not adversely affect the desired properties of the product (e.g., unduly raise the overall $T_g$). The "hard" acrylics may be represented by the formula

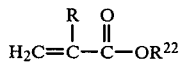

wherein R is as above, $R^{22}$ is preferably alkyl and is methyl when R is H, and is alkyl of from one to about five carbon atoms or alkyl of from about 15 to about 20 carbon atoms when R is methyl. Examples of these hard monomers and other hard monomers include: methyl acrylate, acrylamide, acrylonitrile, isobutyl methacrylate, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

As is known, for a given number of carbon atoms in the alcohol moiety, the extent and type of branching markedly influences the $T_g$, the straight chain products giving the lower $T_g$.

As is apparent, an important property of the backbone polymer is the $T_g$ thereof, and consequently the selection of monomers and proportions thereof depends upon their influence on the $T_g$. "$T_g$" is a conventional criterion of polymer hardness and is described by Flory, "Principles of Polymer Chemistry," pp. 56 and 57 (1953), Cornell University Press. See also "Polymer Handbook", Brandrup and Immergut, Sec. III, pp. 61–63, Interscience (1966). While actual measurement of the $T_g$ can be used, it may be calculated as described by Fox, Bull. Am. Physics Soc. 1,3, p. 123 (1956), or by the use of "Rohm and Haas Acrylic Glass Temperature Analyzer" Publication No. CM-24 L/cb, Rohm and Haas Company, Philadelphia, Pa., 19105. While the actual $T_g$ of the prepolymers is much lower than the calculated $T_g$ because of low molecular weights, the calculated $T_g$ is a relevant indicia of the relative $T_g$s of different polymers. Examples of the $T_g$ of high molecular weight ($>1,000,000$) homopolymers and the inherent $T_g$ thereof which permits such calculations are as follows:

| Homopolymer of | $T_g$ |
|---|---|
| n-octyl acrylate | $-80°$ C. |
| n-decyl methacrylate | $-60°$ C. |
| 2-ethylhexyl acrylate | $-70°$ C. |
| n-butyl acrylate | $-56°$ C. |
| octyl methacrylate | $-20°$ C. |
| n-tetradecyl methacrylate | $-9°$ C. |
| methyl acrylate | $9°$ C. |
| n-tetradecyl acrylate | $20°$ C. |
| t-butyl acrylate | $43°$ C. |
| methyl methacrylate | $105°$ C. |
| acrylic acid | $106°$ C. |

These or other monomers are blended to give the desired $T_g$ of the copolymer.

The polymeric backbone is desirably obtained by solution polymerization of one or more of the ethylenically unsaturated acids with other unsaturated monomers including, among the more preferred vinyl monomers, the esters of acrylic acid or methacrylic acid with benzyl alcohol, phenol, or a saturated monohydric aliphatic alcohol, especially an alkanol having one to 18 carbon atoms, such as cyclopentanol, cyclohexanol, methanol, ethanol, n-propanol, isopropanol, n-butanol, methoxyethanol, ethoxyethanol, methoxyethoxyethanol, ethoxyethoxyethanol, isobutanol, sec-butanol, tert-butanol, any of the pentanols, hexanols, octanols, decanols, dodecanols, hexadecanols, and octadecanols, bearing in mind the required $T_g$ and acid monomer. Preferred vinyl monomers, in addition to the acid, include one or more of an ester of an $\alpha,\beta$-unsaturated carboxylic acid, or, when those from which X is derived are used, an unsaturated nitrile, a vinyl halide, a vinylidene halide, a vinyl aromatic, a vinyl alcohol ester, or an unsaturated hydrocarbon. Other preferred comonomers include acrylonitrile, methacrylonitrile, vinyl acetate, styrene, vinyl toluene (o, m, or p), vinyl chloride or vinylidene chloride, to give the X in the foregoing formula. Blends of copolymers may be used.

The substrates with which the invention is concerned are of all types, including siliceous substrates such as glass sheets, fiberglass textiles, asbestos sheets, asbestos cement products, concrete, stone, stucco, slate, sandstone, granite, ceramics, and porcelain, also fiber reinforced plastic articles such as canoes, boat hulls, or other formed articles made out of fiberglass reinforced polyesters or other plastic materials; metals such as aluminum, steel, iron, brass, wood and other structural materials; metal oxide layers such as those of aluminum oxide and iron oxide; leather; textiles of cellulose such as of cotton, linen, silk, wool, rayon, cellulose esters such as cellulose acetate, nylons, polyesters such as polyethylene glycol terephthalate, acrylonitrile polymers, vinylidene chloride polymers and other vinyl or acrylic ester polymers; films, pellicles, sheets and other shaped articles of plastic systems such as of cellulose ethers or esters including hydroxyethyl cellulose, methyl cellulose, cellulose acetate, cellulose acetate butyrate, polyesters such as polyethylene glycol terephthalate, nylons, vinyl chloride or vinylidene chloride polymers and copolymer, methyl methacrylate polymers and copolymers, aminoplast or phenoplast resins, organopolysiloxane resins, or rubber.

The products of the present invention are particularly valuable in that they usually can be used directly on any of the substrates without the need of a priming coat.

The solvents used in the polymerization may be such organic solvents and mixtures thereof such as benzene, toluene, xylene, solvent naphthas of aliphatic, aromatic, or naphthenic type such as mineral spirits, ethers, esters, acetone, dioxane, etc. Preferred solvents are the monoalkyl ($C_1$-$C_4$) ethers of ethylene glycol, diethylene glycol, or propylene glycol, sold under the trademarks "Carbitol", "Cellosolve", and "Propasol". Of course, other modes of polymerization can be used. The amount of solvent in the polymer is from 0% to 80% based on polymer solids, preferably from 10% to 65%.

Among the drying oils from which the drying oil fatty acid amide is derived are linseed, tung, tall, safflower, conjugated safflower, isano, soya, dehydrated castor, oticica, menhaden, and similar oils, as well as acids not derived from drying oils and of a synthetic origin, with a carbon chain preferably of about 20 carbon atoms or less and having unsaturation which can be caused to air cure in a manner analogous to linseed oil. The preferred oils are those in which the major component contains two or more sets of olefinic unsaturation, in either a conjugated or alternating occurrance, including in addition to oiticica and dehydrated castor oils, those which contain linoleic and/or linolenic acids as the predominant ones.

The preparation of the fatty acid hydroxyamide is carried out by well known procedures, as is the esterification of the carboxyl groups on the polymeric backbone by the hydroxyamide. Exemplary of publications describing these are The Journal of the American Oil Chemists' Society, Volume 46, pages 355–364, published in 1969, which discloses the use of diethanolamine to produce fatty acid hydroxyamide rather than the monoethanolamine which is preferred in the present invention, German Pat. No. 1,940,471, and Belgian Pat. No. 757,271 and corresponding U.S. Pat. No. 3,590,016 noted above, the latter two relating to hard coatings such as paints. The U.S. and Belgian patents are to the same type of polymer generally, although the products taught therein have several defects making them unsuitable for many uses. For example, all of the backbone polymers disclosed are brittle or hard polymers. Thus, it appears that the softest polymer backbone, of the patent examples, would be of styrene and/or methyl methacrylate that would have a glass transition temperature ($T_g$) of 100° C. or above.

Any of the conventional driers or siccatives, such as the linoleates, naphthenates, and resinates of cobalt, zirconium, manganese, lead, cerium, chromium, iron, nickel, uranium, and zinc are suitable. Inorganic acid salts can also be used.

The amount of drier, if used, based on the weight of the hydroxyamide of Formula IV can be as low as 0.01% to as high as 3% or more. Good results are often obtained with combinations of driers, such as zinc naphthenate and cobalt naphthenate in quite small amounts, for example, from 0.01% to 0.5% of the zinc naphthenate together with 0.01% to 0.1% cobalt naphthenate are particularly useful. $Co^{++}$ as cobaltous acetate is also useful, alone or with compounds providing $Mn^{++}$, $Zn^{++}$, $Zr^{++}$, or $Pb^{++}$.

The materials of the invention are particularly useful as additives for latexes as illustrated by Example 3. Suitable latexes are aqueous addition polymer dispersions, generally obtained most conveniently by direct emulsion polymerization. The most important of these dispersions used in making water-based paints are polymers including homopolymers and copolymers of: (1) Vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate 2-ethylhexyl acrylate, methyl methacrylate, ethyl methacrylate and butyl methacrylate; and (30 mono- and di-ethylenically unsaturated hydrocarbons, such a ethylene, isobutylene, styrene, and aliphatic dienes such as butadiene, isoprene, and chloroprene.

Poly(vinyl acetate) and copolymers of vinyl acetate with one or more of the following monomers: vinyl chloride, vinylidene chloride, styrene, vinyltoluene, acrylonitrile methacrylonitrile, one or two of the acrylic and methacrylic acid esters mentioned above are well known as the film-forming component of aqueous base paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile and methacrylonitrile are also more or less conventionally employed in aqueous base paints. Homopolymers of ethylene, isobutylene and styrene, and copolymers of one or more of these hydrocabons with one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following styrene, vinyltoluene, acrylonitrile, methacrylonitrile, and the above mentioned esters of acrylic acid or methacrylic acid. It is also quite common to include a small amount, such as $\frac{1}{2}$ to 5% or more of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. Furthermore, many cationic types of emulsifier are incompatible with the polymers of the invention. The amount of emulsifier may range from about 0.1 to 5% by weight of sometimes even more based on the weight of the total monomer charge. When using a persulfate type of initiator, the addition of emulsifiers is often necessary and this omission of the use of only a small amount, e.g., less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coating less liable to swelling or softening, particularly when subjected to humid atmospheres. The average particle size or diameter of these dispersed polymers may be from about 0.03 to 3 microns or even larger. The particle size, whenever referred to herein, is the "weight average diameter". This number, expressed in microns, is determined using the ultra-centrifuge. A description of the method can be found in the Journal of Colloid Science 15, pp. 563–572, 1960 (J. Brodnyan). In general, the molecular weight of these emulsion polymers are high, e.g., from about 100,000 to 10,000,000 viscosity average, most commonly above 500,000. When used as blends with latex paint polymers, suitable proportions are 1–70%, preferably 10–50% of the alkali soluble polymer with 30–99%, preferably 50–90% latex polymer, solids basis. In a specific use as modifiers for latex gloss paint formulations, 1–25% preferably 1–15% of the soluble air-curing acrylic copolymer with 75–99%, preferably 85–99% of the insoluble latex polymer, results in significant flow and gloss improvements without loss of other critical paint properties. Non-air-curable alkali-soluble acrylic polymers give similar improvements, but detract from key properties such as early water resistance, block resistance, and/or recoatability. The latex polymers are insoluble in aqueous media at a pH of 3–11.

To assist those skilled in the art to practice the present invention, the following modes of operation are suggested by way of illustration, parts and percentages being by weight and the temperature in °C. unless otherwise specifically noted.

In the examples the abbreviations for monomers have the following meanings:

| | |
|---|---|
| BA - butyl acrylate | HEMA - hydroxyethyl methacrylate |
| MMA - methyl methacrylate | MAA - methacrylic acid |
| AA - acrylic acid | BMA - butyl methacrylate |
| S - styrene | EA - ethyl acrylate |
| AN - acrylonitrile | iBMA - isobutyl methacrylate |

The following abbreviations are for the esterified units of Formula V of the specified fatty acid amine, of N-methyl-N-hydroxyethyl amide as follows:

MHELAE—linseed oil acids
MHERSAE—soybean oil acids
MHESAFAE—safflower oil acids
MHEDCAE—dehydrated castor oil acids
MHETAE—tung oil acids
MHESTAE—stearic acid—a non-drying acid The following abbreviations are also utilized in the examples:
HELAE—N-hydroxyethyl linseed oil acid amide ester
HESAFE—N-hydroxyethyl safflower oil acid amide ester unit In the following Table, the prepolymers having a solids content of 85–90% were made by solution polymerization in butyl Cellosolve ®, which was followed by post-polymerization esterification, by the drying oil N-methyl-N-($\beta$-hydroxyethyl)-amide, of a portion of the copolymerized unsaturated acid. The synthesis details are set forth in Table I, with a typical procedure being set forth following Table III.

TABLE I

| No. | BA/MMA/MHELAE[1]/AA | %[2] Initiator[3] | Transfer Agent[4] | Polymerization Temperature (°C.) | Molecular Weight[5] |
|---|---|---|---|---|---|
| A | 40/30/20/10 | 1.0 | 0.25 | 110° C. | 80,000 |
| B | 40/30/20/10 | 1.0 | 0.5 | 110° C. | 42,300 |
| C | 40/30/20/10 | 1.0 | 0.5 | 150° C. | 34,000 |
| D | 40/30/20/10 | 3.0 | 1.0 | 150° C. | 19,000 |
| E | 20/50/20/10 | 1.0 | 0.25 | 110° C. | 75,700 |
| F | 30/40/20/10 | 1.0 | 0.5 | 110° C. | 58,000 |
| G | 30/40/20[6]/10 | 1.0 | 0.5 | 110° C. | 56,000 |
| H | 20/42/30/8 | 1.0 | 0.5 | 150° C. | 22,500 |
| I | 10/42/40/8 | 1.0 | 0.5 | 150° C. | 32,000 |

[1]MHELAE - Ester formed from the reaction of N-methyl-N-($\beta$-hydroxyethyl) linseed amide (MHELA) and copolymer acid
[2]Percent initiator based on prepolymer weight
[3]Lupersol ® PMS - t-butyl peroctoate
[4]Mercaptoethananol
[5]Viscosity average; Mv
[6]Tung oil analogue (MHETAE)

At the higher drying oil levels, the molecular weight of the uncured polymer increases somewhat.

The polymers having a Mv in the neighborhood of 40,000 require significantly less pendant drying oil functionality, in the neighborhood of 20% for good curing characteristics than do polymers of about 20,000 Mv, which show efficient curing at about 40% pendant drying oil functionality.

Cure rate is a function of drying oil type. Cure efficiency is also a function of drying oil type and quantity. Some polymers containing styrene or acrylonitrile are shown to cure at a slightly reduced rate; analogous polymers containing hydroxyethyl methacrylate (HEMA) exhibit an enhanced cure rate.

The viscosity average molecular weights as determined herein are in general agreement with gel permeation chromatography (gpc) molecular weight determinations. In most cases, gpc molecular weights were determined on methylated prepolymers, methylated to reduce the copolymer acid for more reliable measurements. "Prepolymers" are the polymers before esterification with the drying oil hydroxyethyl amides, also called backbone polymers. The molecular weights listed were calculated from the prepolymer molecular weights plus the weight of the drying oil amide. In one example (F) the gpc molecular weight was determined directly on the methylated final polymer. The good agreement between E and F indicates that few crosslinks are formed between drying oil chains during the post-polymerization esterification.

TABLE II

Comparison of Molecular Weight Data by Two Different Techniques

| | | X-10[3] | | | |
|---|---|---|---|---|---|
| No. | BA/MMA/MHELAE[1]/AA | Mv[2] | Mw[3] | Mn[3] | Mw/Mn |
| A | 43/30/20/10 | 80 | 88 | 22 | 4 |
| B | " | 42 | 60 | 19 | 3 |
| C | " | 34 | 24 | 5 | 5 |
| D | " | 19 | 13 | 4 | 3 |
| E | 20/42/30/8 | 22 | 15 | 4 | 3 |

TABLE II-continued

Comparison of Molecular Weight Data
by Two Different Techniques

| No. | BA/MMA/MHELAE[1]/AA | $Mv^2$ | $\mathrm{X\text{-}10^3}$ $Mw^3$ | $Mn^3$ | Mw/Mn |
|---|---|---|---|---|---|
| F | " | | $15^4$ | $4^4$ | 3 |

[1]MHELAE - Ester formed from the reaction of N-methyl-N-(β-hydroxyethyl) linseed amide (MHELA) and copolymer acid
[2]Viscosity average molecular weight
[3]gpc molecular weights determined on methylated prepolymers from which the final molecular weights were calculated
[4]gpc molecular weights determined on methylated final polymer (prepolymer + MHELA) directly The solution viscosities of water-soluble copolymers can be markedly reduced by the addition of a cosolvent. It has been concluded that (a) the solubility parameter and hydrogen bonding class of a cosolvent have no relationship to the efficiency of the cosolvent in reducing solution viscosity, and (b) among the better cosolvents (acetonitrile, isopropanol, isobutanol acetone, methyl ethyl ketone) all are approximately equally effective in reducing solution viscosity. Other useful cosolvents include butyl "Cellosolve", butyl "Carbitol", "Propasol" B, "Propasol" P, and diacetone alcohol.

It is important to promptly cool the batch after the esterification is completed. The reason is that, if the batch is not promptly cooled, gelation may occur. Temperature reductions can be achieved by refluxing a water-xylene azeotrope during esterification and by subsequent removal of the azeotrope by the use of a vacuum without applying additional heat. Esterification temperature and time are also important. When a temperature of 165° is used, esterification must be completed in a much shorter time, for example 10 minutes, in order to have a reasonable gel-free time as compared to esterification at 145° C., where substantial gel-free time is obtained even when the esterification is carried out over a period of 45 minutes. Other factors contributing to gel-free time are copolymerized acid content, in that a lower content of acid gives a longer gel-free time, and the total solids, in that the lower solids content products have a longer gel-free time. Another factor is the nature of the drying oil acid. The order of susceptibility to gelation is as follows: dehydrated castor>tung>linseed=safflower≧soy≧stearic. Additives which will quench the gelation effect are sometimes useful. These additives includes carboxylic acids and aniline. Examples of the acids are: monochloroacetic acid and benzoic acid.

To assist those skilled in the art to practice the present invention, the following modes of operation are suggested by way of illustration, parts and percentages being by weight and the temperature in °C. unless otherwise specifically noted.

The following gives a sample calculation for determining the relative weight ratios of units of Formula II, VII, and X in the final polymer.

Sample Calculation

This illustrates the preparation of 30BA/42MMA/20MHELAE/8AA by reacting the carboxy-containing backbone polymer with N-methyl-N-hydroxyethyl linseed oil acid amide.

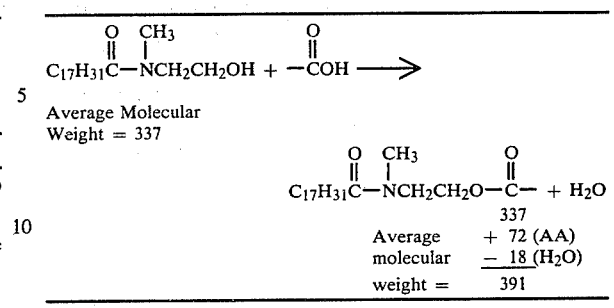

Average Molecular Weight = 337

A prepolymer of composition 35.86BA/50.19-MMA/13.95AA (calculated $T_g=8°$ C.) is reacted with 20.59%, on the basis of prepolymer weight, of N-methyl-N-hydroxyethyl linseed oil acid amide (MHELA). Thus, 100 g. of prepolymer is reacted with 20.59 g. of N-methyl-N-hydroxyethyl linseed oil amide.

$\frac{20.59}{337}$ = .0611 moles amide.

72 × .0611 = 4.40 gms. AA in .0611 moles.
18 × .0611 = 1.10 gms. H$_2$O in .0611 moles.
Wt. of MHELAE units of Formula V 2 20.59 + 4.40 − 1.10 = 23.89 g.

| Final Composition | gms | % |
|---|---|---|
| BA | 35.86 | 30 |
| MMA | 50.19 | 42 |
| AA 13.95 − 4.40 = | 9.55 | 8 |
| MHELAE | 23.89 | 20 |
| | 119.49 | |

The polymer compositions herein were calculated in a similar manner.

EXAMPLE 1

Preparation of 40BA/30MMA/20MHELAE (linseed oil)/10AA having an $\overline{M}v$ of about 40,000)

A monomer mixture of the following materials was prepared:

| | Parts |
|---|---|
| Butyl acrylate | 326.0 |
| Methyl methacrylate | 244.6 |
| Acrylic acid | 110.4 |
| Mercapoethanol | 3.4 |

An initiator solution of the following materials was prepared:

| | |
|---|---|
| Butyl Cellosolve ® | 35.4 |
| Lupersol ® PMS (t-butyl peroctoate) | 13.6 |

The following materials were charged into a reaction vessel fitted with a stirrer, condenser, nitrogen sweep, and two gradual addition apparatuses:

| | |
|---|---|
| Butyl Cellosolve | 88.0 |
| Monomer mixture | 40.8 |

The batch was heated to 110° C. and 6% of the initiator solution was added. Following a fifteen minute hold period the remainder of the monomer mixture and the initiator solution was added proportionally over four hours while maintaining 110°±30° C. Following these additions a mixture of 1.8 parts Lupersol 70 (t-butyl peracetate) and 5.8 parts butyl Cellosolve was added to the batch and the temperature increased to 170° C. The resulting acrylic backbone polymer or prepolymer (47.87BA/35.91MMA/16.21AA) has a calculated $T_g$ of 7° C. At 170° C. a mixture of 134.5 parts N-methyl-N-hydroxyethyl linseed oil fatty acid amide and 65.0 parts xylene was added. The temperature decreased to 153° C. During the next 45 minutes, while maintaining 150°–155° C., 76 parts of a two phase clear solution was distilled from the batch by application of a partial vacuum. Following distillation the batch was cooled to 95° C. and a mixture of 68.5 parts 28% aqueous ammonia and 600 parts of deionized water was added to the batch while maintaining good agitation. At 75° C. the batch was removed from the reaction vessel and packaged in a glass container where the temperature was allowed to fall to room temperature.

The product of this process was a clear aqueous solution with a solids content of 51.4% and a viscosity of 281,000 centipoises. The viscosity average molecular weight was determined to be 42,300. A thin film (1–3 mils) of the above polymer solution containing 0.1% $Co^{++}$ (as cobaltous acetate) became tack free within five hours and cured in one week at room temperature to slightly yellow, alkali insoluble films. The glass transition temperature of the cured film was about +20° C.

EXAMPLE 2

Preparation of 40BA/30MMA/20MHELAE (linseed oil)/10AA having a $\overline{M}v$ of about 80,000

The method of Example 1 was repeated but the mercaptoethanol was reduced to 1.7 parts. The product of this process was a clear aqueous solution with a solids content of 50.7% and a viscosity of 342,000 centipoise. The viscosity average molecular weight was determined to be 80,000. A thin film of this material cured similarly to the film described in Example 1, and has a $T_g$ of about 25° C. in the cured form.

EXAMPLE 3

Preparation of (20BA/42MMA/30MHELAE (linseed oil)/8AA having a $\overline{M}v$ of about 20,000

A monomer mixture of the following materials was prepared:

|  | Parts |
| --- | --- |
| Butyl acrylate | 181.5 |
| Methyl methacrylate | 379.5 |
| Acrylic acid | 120.5 |
| Mercaptoethanol | 6.8 |

This monomer blend (26.6BA/55.7MMA/17.7AA) gives a prepolymer having a calculated $T_g$ of about 43° C.

An initiator solution of the following materials was prepared:

|  | |
| --- | --- |
| Butyl Cellosolve | 35.4 |
| Lupersol PMS | 40.8 |

The following materials were charged into a reaction vessel fitted with a stirrer, nitrogen sweep, condenser and two gradual addition apparatuses:

|  | |
| --- | --- |
| Butyl Cellosolve | 88.0 |
| Monomer mixture | 40.8 |

The batch was heated to 142° C. and 6% of the initiator solution was added. An exotherm to 151° C. was observed. This temperature was maintained for 15 minutes following which the remainder of the monomer mixture and the initiator solution was added over four hours while maintaining 150°±3° C. Fifteen minutes after completion of these additions a mixture of 1.8 parts of Lupersol 70 and 5.8 parts butyl Cellosolve was added to the batch. The temperature was maintained at 150°±2° C. for an additional fifteen minutes after which a mixture of 224 parts N-methyl-N-hydroxyethyl linseed oil amide and 69.0 parts xylene and added gradually over fifteen minutes while still maintaining 150°±2° C. The temperature was then allowed to rise slowly to 155° C. over thirty minutes and 30.0 parts of a two phase clear liquid was distilled from the batch at atmospheric pressure. Following distillation the batch was cooled to 95° C. and a mixture of 50.3 parts 28% aqueous ammonia and 587 parts deionized water was added to the batch while maintaining good agitation. At about 70° C. the batch was removed from the reaction vessel and packaged in a glass container where the temperature was allowed to fall to room temperature.

The product of this process was a clear aqueous solution (referred to below as Copolymer 3 solution) with a solids content of 53.1% and a viscosity of 11,230 centipoise. The viscosity average molecular weight was determined to be 22,500. A thin film (1–3 mils) of the polymer solution containing 0.1% $Co^{++}$ (as cobaltous acetate) became tack free within five hours and cured in two weeks at room temperature to a slightly yellow, alkali insoluble film with a Tukon Hardness of about 1.5 and a glass transition temperature of about 25° C.

A pigment grind was prepared using a Cowles® dissolver and the following materials:

| Pigment Grind | Parts |
| --- | --- |
| Dispersant,* 25% TS | 1.9 |
| Copolymer 3 solution, 53.6% TS | 12.3 |
| Deionized water | 20.3 |
| TiO$_2$, R-900 HG | 65.5 |

*A polymer of maleic anhydride and diisobutylene, in a 1:1 mole ratio.

A very smooth pigment grind was obtained on addition of the TiO$_2$ to the liquid ingredients. The mix was stirred on the Cowles mixer at 3500–4000 ft/min. for 30 minutes. The grind was let down as follows, using a conventional stirrer:

|  | |
| --- | --- |
| Grind A | 34.5 |
| Copolymer 3 solution at 25% TS w/0.1% $Co^{++}$ (as the acetate) on total polymer solids | 65.5 |

The resultant paint had a viscosity of 2700 cps., a pH of 8.5, and on drawdown had a 60° gloss of 80 with a slight yellowish tint. Its tack free time was significantly better than that of commercial solvent alkyd paints with similar gloss properties.

Removal of the dispersing agent resulted in a perfectly satisfactory pigment grind. The ratios employed:

| Pigment Grind B | Parts |
|---|---|
| Copolymer 3 solution, 53.6% TS | 12.5 |
| Deionized water | 20.7 |
| TiO$_2$, R-900 HG | 66.8 |

As above, a Cowles dissolver was used at a peripheral speed of 3500 to 4000 ft/min. to disperse the pigment. The resultant grind was quite smooth, and was much more easily prepared than conventional semi-gloss grinds. The grind was let down with additional water-soluble polymer, as follows:

| Pigment Grind A | 34.5 |
|---|---|
| Copolymer 3 solution, 25% TS with 0.1% cobaltous acetate on total polymer solids | 65.5 |

This paint at an approximate volume solids of 30% and a PVC of 25% with a viscosity of 1750 cps at a pH of 8.5 had good brushability with good flow and levelling, excellent gloss, and a slightly yellowish tint.

Conventional propylene glycol/polyelectrolyte dispersant grinds can also be used; in this case the soluble polymer replaces the latex in the let down stage. A typical grind:

| Pigment Grind C | Parts |
|---|---|
| Dispersant,* 25% TS | 3.1 |
| Nopco ® NDW Dispersant | 5.6 |
| Propylene glycol | 19.5 |
| TiO$_2$, R-900 HG | 76.8 |

*Maleic anhydride - diisobutylene copolymer

As in the other cases, a Cowles dissolver was used in preparing the grind.

The let down stage performed with a conventional stirrer consisted of the following:

| Pigment Grind C | 27.3 |
|---|---|
| Deionized water | 5.6 |
| Copolymer 3 solution, 30% TS | 67.1 |

The metallic drier in the Copolymer 3 solution was varied as tabulated below:

| Paint #3 | −1 | −2 | −3 | −4 | −5 | −6 |
|---|---|---|---|---|---|---|
| drier[1] | 0.1% Co++ | 0.05% Co++ | 0.05% Co++ | 0.05% Co++ | 0.05% Co++ | 0 |
| drier[1] | — | 0.05% Mn++ | 0.05% Zn++ | 0.05% Zr++ | 0.05% Pb++ | 0 |

[1] % Metal on total Copolymer 3 solids

The resultant paints had very good gloss, particularly depth of gloss or image gloss, reflected in 20° gloss measurements. These are summarized below along with 60° gloss and paint viscosity and pH.

| Paint #3 | −1 | −2 | −3 | −4 | −5 | −6 |
|---|---|---|---|---|---|---|
| pH | 8.5 | 8.5 | 8.5 | 8.4 | 8.3 | 8.4 |
| viscosity, cps | 4300 | 3750 | 4500 | 3700 | 3450 | 3600 |
| 20° gloss | 67 | 71 | 61 | 59 | 67 | — |
| 60° gloss | 84 | 81 | 79 | 78 | 84 | 86 |

A conventional latex control, had 60° gloss of 65; the 20° value would typically be 20-25.

An additional variant with good gloss properties is a blend of the water-soluble polymer with a conventional acrylic latex (EA/MMA/MAA 57/42/1) on a 20/80 basis. The following proportions were used:

| | Parts |
|---|---|
| Pigment Grind C | 33.2 |
| Deionized water | 6.8 |
| Latex, 46.5% TS | 39.5 |
| Copolymer 3 solution, 30% TS w/0.1% Co++ | 20.5 |

This paint exhibited 20°/60° gloss of 31/80, not as good as for the examples above incorporating only the water-soluble polymer, but significantly better than the gloss of a paint formulated without copolymer C as follows:

| Pigment Grind C | 36.1 |
|---|---|
| Latex, 46.5% Total Solids | 57.3 |
| Propylene Glycol | 5.0 |
| Texanol ® | 1.6 | which had a 60° gloss of 65. (Its 20° gloss was not measured, but typical values observed for equivalent formulations averaged 28.).

EXAMPLE 4

Preparation of (20BA/42MMA/30MHESAE)(soybean)/8AA Polymer having a $\overline{M}v$ of about 20,000

The method of Example 3 was repeated with an equal weight of N-methyl-N-hydroxyethyl soybean oil acid amide in place of N-methyl-N-hydroxyethyl linseed oil acid amide. The product of this process was a clear aqueous solution with a solids content of 53.4% and a viscosity of 19,000 centipoise. The copolymer acid titer was 1.13 meq/gram of polymer. A thin film (1-3 mils) of the above polymer solution containing 0.1% Co++ (as cobaltous acetate) cured in two weeks at 60° C. to a slightly yellow alkali insoluble film of Tukon Hardness about 2.0.

EXAMPLE 5

Preparation of (40BA/20MMA/20MHELAE)(linseed oil)/20AA Polymer having a $\overline{M}v$ of about 20,000

The method of Example 3 was repeated with the butyl acrylate changed to 326 parts, the methyl methacrylate to 163 parts, the acrylic acid to 191.5 parts, the mercaptoethanol to 3.41 parts, the N-methyl-N-hydroxyethyl linseed oil amide to 134.5 parts, the aqueous ammonia to 138 parts and the deionized water to 542 parts. The acrylic backbone (47.9BA/24MMA/28.1AA) has a calculated $T_g$ of 8° C.

The product of this process was a clear aqueous solution of solids content 50.7% and a viscosity of 14,500 centipoise. The viscosity average molecular weight was determined to be 21,000.

EXAMPLE 6

Preparation of 20BA/42MMA/30MHELAE(linseed oil)/8AA Polymer having a $\overline{M}v$ of about 20,000; Triethyl Amine Neutralization The method of Example 3 was repeated with 111.1 parts of triethylamine in place of the 28% ammonia solution and the deionized water decreased to 526.6 parts. The product of this process was a slightly hazy aqueous solution of solids content 53.6% and a viscosity of 11,650 centipoises. A thin film (1–3 mils) of this polymer cured similarly to the polymer described in Example 3.

EXAMPLE 7

Preparation of (5BA/42MMA/45MHELAE)(linseed oil)/8AA Polymer having a $\overline{M}v$ of about 20,000

The method of Example 3 was repeated with the butyl acrylate changed to 53.8 parts, the methyl methacrylate to 456.0 parts, the acrylic acid to 172.4 parts, the N-methyl-N-hydroxyethyl linseed oil amide to 403 parts, the 28% aqueous ammonia to 66.7 parts and the deionized water to 571 parts. The acrylic backbone (7.9BA/66.8MMA/25.3AA) has a calculated $T_g$ of 84° C.

The product of this process was a hazy aqueous solution of solids content 56.7% and a viscosity greater than 100,000 centipoise, and is hereinafter referred to as Copolymer 7 solution. A thin film (1–3 mils) of this polymer solution containing 0.1% Co++ (as cobaltous acetate) cures to a yellow, alkali insoluble film of Tukon Hardness about 3.0 and a $T_g$ of approximately 50° C. after two weeks at 25° C.

Copolymer 7 solution was incorporated in the preferred grind for these water-soluble vehicles, incorporating only pigment, polymer, and water and eliminating the need for coalescent, wet edge aids, dispersants, as follows:

| Pigment Grind D | Parts |
| --- | --- |
| Copolymer 7 solution, 25% TS | 49.2 |
| Deionized water | 1.6 |
| TiO$_2$, R-900 HG | 49.2 |

Standard techniques using the Cowles dissolver were followed. The grind was let down with additional water-soluble polymer incorporating varying levels of metallic drier. The overall recipe for this series included:

| Paint #7 | −1 | −2 | −3 | −4 |
| --- | --- | --- | --- | --- |
| Pigment Grind D | 44.1 | 44.1 | 41.4 | 36.4 |
| Copolymer 7 solution, 24% TS + Drier | 55.9 | 55.9 | 52.4 | 46.0 |
| Deionized water | 0 | 0 | 6.2 | 17.6 |

[1]Drier levels for Paint Nos. 7-1, 2, 3, 4, were 0, 0.1, 0.25 and 0.5% Co++ on polymer solids respectively, as cobaltous acetate.

These paints had pH's, viscosities, gloss (range of 82–94) and other properties characteristics of the earlier paint series. In addition, the alkali scrub resistance was measured using a Gardner ® scrub machine with 1 lb. boat, 1% Tide ® (detergent) solution for 500 cycles; the 60° gloss before and after scrub was monitored. The substrates were 7 mil drawdowns on black vinyl charts. Paint No. 7-1 (no drier) was completely removed from the panel after a three day air dry; after one week 30% of the film was removed. After a one day air dry the gloss of Paint No. 7-4 (0.5% Co++) went from 92 to 81 after the 500 cycle scrub, whereas after 7 days air dry the gloss change was from 89 to 82 or −8%. Two days dry time was sufficient for 90% gloss retention at 0.25% Co++.

EXAMPLE 8

Preparation of 30BA/40MMA/20MHELAE)(linseed)/10AA Polymer having a $\overline{M}v$ of about 40,000

The method of Example 1, with the exception that the butyl acrylate was changed to 245 parts and the methyl methacrylate to 327 parts, was employed through completion of the addition of the monomer mixture to the reaction vessel. This monomer mix (35.9BA/47.9MMA/16.2AA) gives a calculated $T_g$ of 26° C. Following the monomer mixture addition the batch was heated to 150° C. and a mixture of 1.8 parts Lupersol 70 and 5.8 parts butyl Cellosolve was added and the temperature maintained. After fifteen minutes a mixture of 134.5 parts N-methyl-N-hydroxyethyl linseed oil amide and 63 parts xylene was added gradually over about 10 minutes while maintaining 150°±2° C. The temperature was then allowed to rise slowly to 155° C. over thirty minutes and 24 parts of a two phase clear liquid was distilled from the batch at atmospheric pressure. Following distillation the batch was cooled to 98° C. and a mixture of 68.5 parts 28% aqueous ammonia and 600 parts deionized water was added to the batch while maintaining good agitation. At 69° C. the batch was removed from the reaction vessel and packaged in a glass container where the temperature was allowed to fall to room temperature.

The product of this process was a clear aqueous solution with a solids content of 47.9% and a viscosity of 67,500 centipoises. The copolymer acid titer was determined to be 1.34 meq/gram of polymer and the viscosity average molecular weight 58,000. A thin film of this polymer solution containing 0.1% Co++ (as cobaltous acetate) (copolymer 8 solution) cured in two weeks to a slightly yellow, alkali insoluble film with a Tukon Hardness of about 2.5 and a glass transition temperature of about +40° C.

Excellent pigment grinds and paints were prepared from this polymer. A standard Cowles grind was prepared as follows:

| | Parts |
| --- | --- |
| Copolymer 8 solution, 47.9% | 25.1 |
| Deionized water | 26.7 |
| TiO$_2$, R-900 HG | 48.2 |

The grind was let down with additional Copolymer 8 solution and water carefully added until the consistency appeared right for brushout. The final mix contained:

| | |
| --- | --- |
| Pigment Grind | 66.5 |
| Copolymer 8 solution, 23.5% | 26.8 |
| Deionized water | 6.7 |

This paint had brushability, good gloss, and good flow/levelling, comparable to earlier paints prepared from copolymers 3 and 7.

EXAMPLE 9

Preparation of
30BA/40MMA/20MHESAFAE(safflower)/10AA
Polymer having $\overline{M}v$ of about 40,000

The method of Example 8 was used with the exception that N-methyl-N-hydroxyethyl safflower oil amide was substituted for N-methyl-N-hydroxyethyl linseed oil amide.

The product of this process was a clear aqueous solution of solids content of 51.7% and a viscosity of 176,000 centipoise. A thin film of this material cured in the manner described in Example 8 exhibited similar film behavior with the exception that the cured film was of lighter color.

EXAMPLE 10

Preparation of
30BA/40MMA/15MHEDCAE(dehydrated castor)/5MHETAE(tung)/10AA Polymer having a $\overline{M}v$ of about 40,000

The method of Example 8 was used with the exception that a mixture of 168 parts N-methyl-N-hydroxyethyl dehydrated castor oil amide and 56 parts N-methyl-N-hydroxyethyl tung oil amide was used in place of 224 parts of N-methyl-N-hydroxyethyl linseed oil amide.

The product of this process is a clear aqueous solution of solids content 48.7% and a viscosity of 257,000 centipoise. The copolymer acid titer was determined to be 1.37 meq/gram of polymer. A thin film (1–3 mils) of this polymer containing 0.1% $Co^{++}$ (as cobaltous acetate) became tack-free within five hours and cured in six days to a slightly yellow, alkali insoluble film of Tukon Hardness about 3.4.

EXAMPLE 11

Preparation of
30BA/40Styrene/20MHELAE(linseed)/10AA
Polymer ($\overline{M}v$ about 40,000)

The method of Example 8 was used with the exception of substitution of styrene for methyl methacrylate, giving a calculated $T_g$ for the acrylic prepolymer (35.9BA/47.9S/16.2AA) of 26° C.

The product of this process is a clear aqueous solution of solids content 49.7% and a viscosity of 304,000 centipoise. The copolymer acid titer was 1.44 meq/gram of polymer. A thin film (1–3 mils) of this polymer containing 0.1% $Co^{++}$ (as cobaltous acetate) cured in six weeks at 25° C. to a slightly yellow, alkali insoluble film of Tukon Hardness about 7.5.

EXAMPLE 12

Polymer of 43BA/27AN/20MHELAE(linseed oil)/10AA ($\overline{M}v$ about 40,000)

The method of Example 8 was used with the exception that the butyl acrylate level was increased to 350 parts and acrylonitrile substituted for methyl methacrylate at a level of 221 parts. The backbone acrylic polymer (51.4BA/; 32.4AN/16.22AA) has a $T_g$ (calculated) of 0° C.

The product of this process is a clear aqueous solution of solids content 49.4% and a viscosity of 490,000 centipoise. A thin film (1–3 mils) of this polymer cured in six weeks at 25° C. to a slightly yellow, alkali insoluble film of Tukon Hardness about 5.0.

EXAMPLE 13

Polymer of
27BA/34MMA/20MHELAE(linseed)/14HEMA/-5AA ($\overline{M}v$ about 40,000)

The method of Example 8 was employed with the exception that the monomer mixture was composed of the following: butyl acrylate 200 parts, methyl methacrylate 277 parts, hydroxyethyl methacrylate 114.7 parts, acrylic acid 69.5 parts, mercaptoethanol 3.4 parts. The aqueous ammonia was reduced to 34.4 parts and the deionized water increased to 634 parts. The backbone (32.3BA/40.7MMA/16.8HEMA/10.2AA) has a calculated $T_g$ of 27° C.

The product of this process is a clear aqueous solution of solids content 49.2% and a viscosity of 465,000 centipoise. The copolymer acid titer was 0.83 meq/gram polymer. A thin film (1–3 mils) of this polymer containing 0.1% $Co^{++}$ (as cobaltous acetate) cures in two weeks at 25° C. to a slightly yellow, alkali insoluble film of Tukon Hardness about 2.5.

EXAMPLE 14

Polymer of 70BMA/20MHETAE (tung)/10MAA ($\overline{M}v$ about 40,000)

The method of Example 8 was employed with the exceptions that: (1) the monomer mixture (83.4BMA/16.6MAA) which gives a calculated $T_g$ of 38° C. was composed of the following: butyl methacrylate 568 parts, methacrylic acid 113 parts, mercaptoethanol 3.4 parts; (2) 129.9 parts N-methyl-N-hydroxyethyl tung oil amide was used in place of the N-methyl-N-hydroxyethyl linseed oil amide; (3) the aqueous ammonia and deionized water changed to 57.1 parts and 630 parts respectively and (4) an additional 500 parts of butyl Cellosolve was added to the final polymer solution.

The product of this process was a clear solution of solids content 40.2% and a viscosity of 3,370 centipoises. The copolymer acid titer was 1.14 meq/gram polymer.

A thin film (1–3 mils) of this polymer containing 0.1% $Co^{++}$ (cobaltous acetate) cures in two weeks at 25° C. to a slightly yellow, alkali insoluble film of Tukon Hardness about 10 and with a glass transition temperature of about 60° C.

EXAMPLE 15

Polymer of 40BA/40MMA/10MHETAE(tung)/10AA ($\overline{M}v$ about 40,000)

The method of Example 8 was employed with the exception that (1) the monomer mixture was composed of the following: butyl acrylate 297 parts, methyl methacrylate 297 parts, acrylic acid 87.2 parts, mercaptoethanol 3.4 parts, and (2) 61.2 parts N-methyl-N-hydroxyethyl tung oil amide was used in place of the N-methyl-N-hydroxyethyl linseed oil amide, and (3) the aqueous ammonia and deionized water changed to 62.5 parts and 548 parts respectively. The acrylic prepolymer of 43.6BA/43.6MMA/12.8AA has a calculated $T_g$ of 14° C.

The product of this process was a clear solution of solids content 48.8% and a viscosity of 308,000 centipoise. A thin film (1–3 mils) of this polymer containing 0.1% Co++ (as cobaltous acetate) cured in two weeks at room temperature to a slightly yellow, alkali insoluble film of Tukon Hardness about 1.5. A polymer of 10BA/27.5BMA/40iBMA/10MHETAE/12.5AA had similar properties.

COMPARATIVE EXAMPLE A

Polymer of 20BA/42MMA/30MHESTAE (Stearate)8AA ($\overline{M}v$ about 20,000)

This is a saturated fatty acid which is disclosed in U.S. Pat. No. 3,590,016.

The method of Example 3 was repeated with 456 g. of a 49.2% solution of N-methyl-N-hydroxyethyl stearamide in xylene in place of the N-methyl-N-hydroxyethyl linseed amide in xylene solution. The product of this process was a cloudy solution which clarified on heating to 60° C. The solids content was 53.4%. The viscosity at room temperature was 37,200 centipoise. A thin film (1–3 mils) of this polymer solution containing 0.1% Co++ (as cobaltous acetate) remained soft, tacky and alkali soluble indefinitely.

COMPARATIVE EXAMPLE B

This is Example 16 of U.S. Pat. No. 3,590,016. The acrylic prepolymer (89.4MMA/10.6MAA), having a calculated $T_g$ of above 105° C. is reacted with the hydroxyethyl amide of safflower oil fatty acids, to give a polymer of the composition 79.2MMA/14.5HESAFE/6.3MMA.

This example was repeated as described in the patent with the exception that prior to the final dilution with water and KOH the batch was split into two portions. One portion was neutralized with KOH/H₂O as described in the patent and the other with an equivalent amount of ammonia/water.

According to the patent, the prepolymer is obtained as a solution (col. 12, line 45) but in this attempt to repeat the example a heterogeneous mixture was obtained. The mixture eventually becomes homogeneous on additions of the amide and solvent.

| | Results | |
|---|---|---|
| | Portion I-B (KOH Neut.) | Portion II-B (NH₃ Neut.) |
| Appearance | slightly hazy | cloudy |
| % T.S. | 42.0 | 44.2 |
| Visc. (cps) | 18,500 | 38,000 |
| Titer meq. NH₃/g. T.S. | — | 0.457* |
| meq. acid/g. T.S. | 0.710** | 0.706** |

Note:
*This level of ammonia does not fully neutralize the polymer. It is equimolar with the level of KOH used in the patent. Addition of enough more NH₃ to fully neutralize the polymer yields a clear homogenous solution.
**The Patent - 0.696 meq. acid/g. T.S.
Theory (100% reaction) - 0.710 meq. acid/g. T.S.

COMPARATIVE EXAMPLE C

Final Composition 35.80 S/56.65 HELAE/7.54 AA
HELAE—hydroxyethyl linseed amide ester Example 17 of U.S. Pat. No. 3,590,016 was repeated as described in the patent with the exception that prior to the final dilution with water (col. 13, line 30) the batch was divided into three portions. Portion A was neutralized and diluted with KOH (~0.25 equivalents on polymer acid) and water with agitation as described in the patent. This yielded a polymer dispersion. Portion B was treated as the first except that an equimolar level of ammonia was used in place of KOH. This also yielded a polymer dispersion. Portion C was diluted with a full equivalent of ammonia (on polymer acid) and only enough water to yield a clear solution of about 47% T.S.

Both dispersions were very unstable. Gross sedimentation was observed within 18 hours. Also the odor of all three samples was extremely strong. This odor was a characteristic mercaptan odor and is probably due to the t-dodecyl mercaptan used in the polymerization.

| | Results | | |
|---|---|---|---|
| | Portion I-C | Protion II-C | Portion III-C |
| Appearance | milky white* | milky white* | clear solution |
| % T.S., excluding Sediment | 10% | 10% | 46.7 |
| Visc. (cps) | 100 | 100 | 9,200 |
| Titer meq. NH₃/gm T.S. | ** | ** | 1.18 |
| acid meq/gm. T.S. | | | 1.33* |

*Dispersion sedimented within 18 hours
**Titer of dispersion meaningless as compared with solution
**Theory (100% reaction) - 1.01 meq. acid/gm T.S. The Patent - 1.39 meq. acid/gm T.S. (70% reaction)

TABLE III

| | Viscosity (cps) | | Copolymer acid titer (meq/gm T.S.) | |
|---|---|---|---|---|
| Portion | Initial | 10 days/60° C. | Initial | 10 days/60° C. |
| I-B | 18,500 | 22,000 | 0.710 | 0.832 |
| II-B | 38,000 | 40,200 | 0.706 | 0.708 |
| III-C | 9,200 | 8,900 | 1.33 | 1.43 |

CURE STUDY

Data on the cure of polymers prepared by Comparative Examples B and C are given in Table IV. The last product is a typical polymer of this invention.

CONCLUSIONS

EXAMPLE B

The samples prepared according to this example are unsatisfactory for the following reasons:
(1) Films are too hard and brittle
(2) Not enough cure to develop satisfactory alkali resistance
(3) The sample neutralized with KOH has poor hydrolytic-stability as indicated by the increased acid titer on heat aging.

EXAMPLE C

The dispersed samples were unsatisfactory because of the poor sedimentation stability. In fact the samples sedimented so rapidly it was not possible to complete their evaluation. The solubilized variation of this example exhibited adequate cure and hydrolytic stability; however, the obnoxious odor of the solution plus the excessive hardness and color of the cured film make this polymer unacceptable.

TABLE IV

Cure Study
1.5 ml (dry) films containing 0.1% Co$^{++}$

| Example | Composition | Neut. Base | Tg$^3$ °C. | Tg$^4$ °C. | 16 hr/60° C. | | | 2 wk/25° C. | |
|---|---|---|---|---|---|---|---|---|---|
| | | | | | Color | Tukon$^4$ Hardnesss | Sol.$^2$ Fraction | Color | Tukon Hardness | Sol. Fraction |
| I-B | 79.2 MMA/14.5 HESAFAE/6.3 MMA | KOH | 105 | — | 0 | 14.0 | 0.928 | 0 | — | 0.88 |
| II-B | 79.2 MMA/14.5 HESAFAE/6.3 MMA | NH$_3$ | 105 | 86 | 1 | 16.7 | 0.615 | 1 | 15.0 | 0.807 |
| III-C | 35.8 S/56.65 HELAE/7.54 AA | NH$_3$ | 105 | 71 | 6 | 13.2 | 0.168 | 5 | 9.6 | 0.349 |
| Ex. 15 (this invention) | 30 BA/42 MMA/15 (MHEDCAE/5 MHETAE/8 AA | NH$_3$ | 25 | 2 | 2 | 2.16 | 0.172 | 1 | 1.4 | 0.233 |

$^1$0-no color; 5 very colored
$^2$Fraction of film soluble in 1/1 mixture by volume of 10% ammonia and isopropanol. The lower the soluble fraction the more highly cured the film.
$^3$Prepolymer as calculated.
$^4$Cured film of final polymer.

EXAMPLE 16

10 BA/40 MMA/40 MHESAE/10 AA-$\overline{M}$v about 40,000

A monomer mixture of the following materials was prepared:

| | Parts |
|---|---|
| Butyl acrylate | 203.0 |
| Methyl methacrylate | 812.0 |
| Acrylic Acid | 346.0 |

An initiator solution of the following materials was prepared.

| | |
|---|---|
| Butyl Carbitol ® | 70.3 |
| t-Butyl perbenzoate (85%) | 0.8 |

The following materials were charged into a reaction vessel fitted with a stirrer, condenser, nitrogen sweep, and two gradual addition apparatuses:

| | |
|---|---|
| Butyl Carbitol | 600.0 |
| Monomer mixture | 203.4 |
| Initiator solution | 10.6 |

The contents of the reaction vessel were heated to 150°–155° C. and the remainder of the monomer mixture and the initiator solution were added proportionally over four hours while maintaining 150°–155° C. Following these additions a mixture of 3.2 parts t-butyl perbenzoate and 11.5 parts butyl Carbitol was added to the batch. After a fifteen-minute hold period and with the temperature at 15°–155° C., 758.0 parts of an 88% solution of N-methyl-N-hydroxyethyl soybean oil fatty acid amide was added gradually over fifteen minutes. The temperature was maintained at 150°–155° C. during the next 35 minutes while about 40 parts of a clear liquid solution was distilled from the batch. Following distillation the batch was cooled to 130° C. and 675 parts of butyl Carbitol was added. The batch was then cooled to about 85° C. and packaged.

The product of this process was a clear solution with a solids content of 60.7%, a viscosity of 79,500 centipoise and a copolymer acid titer of 1.35 meg/gm. total solids. Prior to use this material was diluted to 25% total solids with water and 1.0 equivalent of aqueous ammonia.

EXAMPLES 17A–17C

Three separate pigment grinds were prepared using a Cowles ® dissolver and the following materials:

| | Parts |
|---|---|
| Propylene glycol | 63.4 |
| Pigment dispersant* (35% TS) | 8.6 |
| Defoamer (Deefo ® 495) | 2.2 |
| TiO$_2$ pigment | 216.3 |

*Alkali soluble polymer of 70% hydroxyethyl methacrylate and 30% methacrylic acid.

These grinds were let down with the following materials

| | Parts | | |
|---|---|---|---|
| | A | B | C |
| Acrylic latex (46% TS) | 518.8 | 518.8 | 554.3 |
| Product of Ex. 16 (25% TS) | 77.2 | — | — |
| Glascol ® DP-1232$^1$ (30% TS) | — | 64.3 | — |
| Propylene glycol | 39.6 | 39.6 | 39.6 |
| Texanol ® Coalescent | 5.0 | 5.0 | 5.0 |
| Butyl Carbitol | 5.0 | 5.0 | 5.0 |

$^1$Glascol DP-1232 is a product of Allied Colloids, Inc. It is a commercial, non-curing alkali soluble polymer sold as a flow and gloss improver for latex gloss paints.

| | Parts | | |
|---|---|---|---|
| | A | B | C |
| Super-Ad-It ® (Preservative) | 1.0 | 1.0 | 1.0 |
| Dicapryl sodium sulfosuccinate (65% TS) | 0.5 | 0.5 | 0.5 |
| Water | 46.9 | 59.8 | 82.4 |
| Deefo ® 495 | 2.5 | 2.5 | 2.5 |
| Cobalt Naphthenate (6% Co$^{++}$) | 0.32 | — | — |
| Water and/or hydroxyethyl cellulose solution (at 2.5% TS) | 36.0 | 36.0 | 36.0 |
| N,N,Dimethyl ethanolamine | 4.2 | 4.2 | 4.2 |

The resulting paints had viscosities of 75–80 Krebs Units and pH's 9.2–9.6. All three paints are at 19 PVC (pigment volume concentration).

The key properties of these three paints which are relative to this invention are listed below:

|  | Paint | | |
|---|---|---|---|
|  | A 7.5% Ex. 16 Product | B 7.5% DP-1232 | C No ASR |
| Gloss (60°/20°) | 85/47 | 85/48 | 75/34 |
| Flow (0-poor; 10-excellent) | 6 | 8 | 8 |
| Block Resistance (0-poor; 10-excellent) | 5 | 0 | 1 |
| Recoatability | OK | poor | OK |
| Stain resistance | v. good | fair | fair |
| Stability | OK | OK | OK |

We claim:

1. In a method of coating an article with a paint containing an aqueous alkaline solution of an addition polymer solubilized in said solution by a volatile amine or ammonia, said solubilized polymer having the structure:

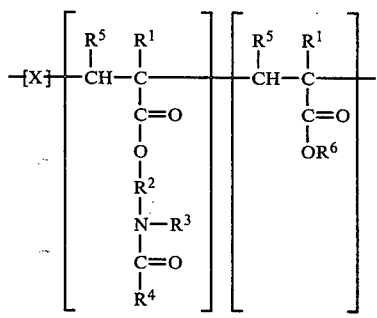

I wherein
$R^1$ is H, a lower alkyl radical having one to five carbon atoms, halogen, —CN, or —CH$_2$COOR, —COOR, or —CH$_2$COOH, R being a lower alkyl radical having from one to eight carbon atoms;
$R^2$ is $(CR^7_2)_n$ wherein $R^7$ is —H or —CH$_3$ and n is 1 or 2;
$R^3$ is H, or a lower alkyl radical having from one to 8 carbon atoms;
$R^4$ is an unsaturated, air-curable alkyl radical;
$R^5$ is H, —COOH, —CONH$_2$, or —COOR, wherein R is as above;
$R^6$ is H, or an aliphatic or cycloaliphatic radical having from one to 20 carbon atoms; and
X is optional and when present is derived from at least one vinyl monomer different than the residues depicted;
the units in brackets being in any order, portions of the $R^6$ radicals being as hereinafter defined in units of the formula:

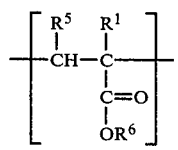

II $R^6$ being H in a sufficient number of units of Formula II to provide the polymer with a carboxy content of 0.5–6 meq/g. of polymer, the quantity of carboxy groups being sufficient, when in the form of salt groups with said amine or ammonia, to confer water solubility upon the polymer, the amount of carboxy-containing units of Formula II wherein $R^6$ is H being between 5 and 40 parts by weight of the total polymer; optionally a portion of the radical $R^6$ in the units of Formula II being at least one aliphatic or cycloaliphatic radical and being selected so that the units are derived from at least one ester which when homopolymerized gives a high molecular weight polymer having a $T_g$ of between −80° C. and 120° C., said ester units forming up to 90 parts by weight of the polymer; the polymer having between about 5 and 60 parts by weight of units of the formula:

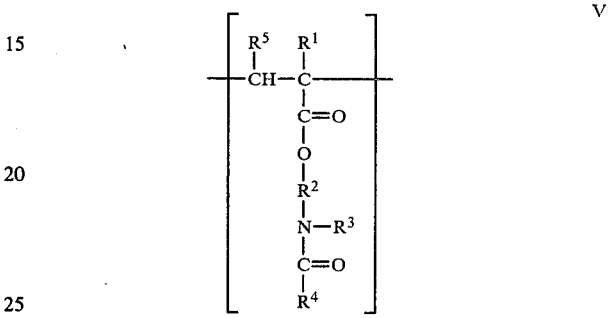

V wherein $R^1$, $R^2$, $R^3$, $R^4$, and $R^5$ are as identified above, any balance of the polymer being the units of —X— of addition polymerized ethylenically unsaturated monomers other than said units of Formulas II and V, the total parts of all said units being 100, the $\overline{M}v$ of the polymer being between about 5,000 and 200,000, the $T_g$ of a cured film of the polymer being between about −20° C. and 80° C., the Tukon Hardness of the cured film being between about 0.2 and about 15, in which the composition optionally includes a metal compound drier in an amount up to 0.5%, on a metal basis, of the total polymer weight in the composition, applying a thin uniform coating of the aqueous solution to a substrate, and drying and curing said coating in the presence of air.

2. The method of claim 1 in which the polymer composition contains units of:
(a) 0–50 parts by weight of a monomer selected from esters of acrylic acid or methacrylic acid, which when homopolymerized gives a polymer having a $T_g$ of between about 0° C. and −80° C.
(b) 20–70 parts by weight of a monomer selected from esters of acrylic acid or methacrylic acid, vinyl aromatic hydrocarbons and unsaturated nitriles which when homopolymerized gives a polymer having a $T_g$ between about 20° C. and 120° C.,
(c) 5–30 parts of an ethylenically unsaturated carboxylic acid, optionally with up to 30 parts of a different ethylenically unsaturated monomer which confers hydrophilicity to the polymer and enhances its solubility in aqueous liquids, the quantity of ethylenically unsaturated acid being between about 0.6 and 4.5 meq/g. of polymer, and
(d) 10–50 parts by weight of units of Formula V, and the total of (a), (b), (c), and (d) being 100.

3. The method of claim 2 in which the polymer composition contains mer units wherein:
(a) is at least 10 parts and is selected from one or more of ethyl acrylate, butyl acrylate, 2-ethylhexyl acrylate, sec-butyl acrylate, isobutyl acrylate, and isopropyl acrylate, (b) is selected from one or more of methyl methacrylate, styrene, ethyl methacrylate, acrylonitrile, butyl methacrylate, isobutyl methacrylate, and vinyl toluene, (c) is selected from one or more of acrylic acid, methacrylic acid, maleic acid, and itaconic acid, and is present in an amount of from 8 to 15 parts, with 0–20 parts of one or more of hydroxyethyl (meth)acrylate and hydroxypropyl (meth)acrylate, and (d) is present in the amount of between about 20 and 50 parts, the polymer consisting essentially of (a), (b), (c), and (d).

4. The method of claim 3 in which the units of Formula V are such that n is 2, $R^3$ is —H, —$CH_3$, or $CH_3CH_2$—, and $R^4$ is the residue of one or more of the drying oil acids selected from tung oil acids, linseed oil acids, dehydrated castor oil acids, safflower and conjugated safflower oil acids, soybean oil acids, and oiticica oil acids, the $\overline{M}v$ is between about 20,000 and 80,000 and the thickness of the cured coating being between about 0.1 and 10 mils.

5. The method of claim 4 in which a blend of said drying oil acids is utilized which contains 50–90% by weight of dehydrated castor, safflower, conjugated safflower, or soybean oil acids, or a mixture thereof, with 10–50% by weight of tung oil acids, the $T_g$ of a cured film of the polymer being less than about 60° C., and the calculated $T_g$ of the backbone polymer being below about 50° C.

6. The method of claim 1 in which the polymer contains units consisting essentially of:

(ab) 45–90 parts by weight of butyl methacrylate (c) 5–20 parts of an ethylenically unsaturated carboxylic acid, the quantity of ethylenically unsaturated acid being between about 0.6 and 4.5 meq/g. of polymer, optionally with up to 20 parts of a different ethylenically unsaturated monomer which confers hydrophilicity to the polymer and enhances its solubility in aqueous liquids, and (d) 10–50 parts by weight of units of Formula V, and the total of (ab), (c), and (d) being 100.

7. The method of claim 6 in which (c) is selected from one or more of acrylic acid, methacrylic acid, maleic acid, and itaconic acid, and the $\overline{M}v$ is between about 10,000 and 200,000.

8. The method of claim 7 in which the units of Formula V are such that n is 2, $R^3$ is —H, —$CH_2CH_3$, or —$CH_3$, and $R^4$ is the residue of one or more of the drying oil acids selected from tung oil acids, linseed oil acids, dehydrated castor oil acids, safflower and conjugated safflower oil acids, soybean oil acids, and oiticica oil acids, the $\overline{M}v$ is between about 20,000 and about 80,000 and the thickness of the cured coating is between about 0.1 and 10 mils.

9. The method of claim 8 in which a blend of said drying oil acids is utilized which contains 50–90% by weight of dehydrated castor oil acids, safflower or conjugated safflower acids, or a mixture thereof, with 10–50% by weight of tung oil acids.

10. An article of manufacture prepared by the method of claim 1, 2, 3, 4, 5, 6, 7, 8, or 9, in which the cured coating is from 0.1 mil to 10 mils in thickness, the Tukon hardness of the cured film being between about 0.2 and about 15.

11. The method of claim 1 in which the soluble polymer is blended with an insoluble latex polymer, the proportions being 1–70% of the soluble polymer to 30–99% of the latex polymer on a solids basis.

12. The method of claim 11 in which 1–25% of the soluble polymer acid 75–99% of the latex polymer is present in the blend.

13. The method of claim 11 in which 1–15% of the soluble polymer and 85–99% of the latex polymer is present in the blend.

14. An article of manufacture prepared by the method of claim 11.

15. A polymer composition consisting essentially of the following mer units in the amount of (a) 0–50 parts by weight of one or more of ethyl acrylate, butyl acrylate, 2-ethylhexyl acrylate, sec-butyl acrylate, isobutyl acrylate, and isopropyl acrylate, (b) 20–70 parts by weight of one or more of methyl methacrylate, ethyl methacrylate, butyl methacrylate, sec-butyl methacrylate, t-butyl methacrylate, isopropyl methacrylate, acrylonitrile, isobutyl methacrylate, styrene, and vinyl toluene, (c) 5–20 parts by weight of one or more of acrylic acid, methacrylic acid, maleic acid, and itaconic acid, with 0–20 parts by weight of one or more of hydroxyethyl (meth)acrylate and hydroxypropyl (meth)acrylate, (d) 10–50 parts by weight of units of the formula:

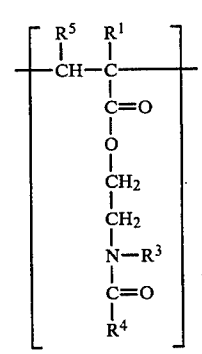

Va wherein $R^1$ is H, a lower alkyl radical having one to five carbon atoms, halogen, —CN, or —$CH_2COOR$, —COOR, or —$CH_2COOH$, R being a lower alkyl radical having from one to eight carbon atoms;

$R^3$ is H, or a lower alkyl radical having from one to eight carbon atoms;

$R^4$ is an unsaturated, air curable alkyl radical;

the total of (a), (b), (c), and (d) being 100, the quantity of (c) being 0.5 to 6 meq/g. of polymer and being sufficient, when in the form of salt groups with a volatile amine or ammonia, to confer water solubility upon the polymer, the $\overline{M}v$ of the polymer being between about 5,000 and 200,000, the polymer being oxidatively curable by air, the residue

being a drying oil acid residue derived from one or more of tung oil acids, linseed oil acids, dehydrated castor oil acids, safflower oil acids, conjugated safflower oil acids, soybean oil acids, and oiticica oil acids, the $T_g$ of a cured film of the polymer being between about 10° and 65° C.

16. The polymer of claim 15 in which said residue

is derived from a blend of 50-90% by weight of one or more of dehydrated castor oil acids, safflower oil acids, conjugated safflower oil, or soybean oil acids, with 10-50% by weight of tung oil acids.

17. The polymer composition of claim 15 in alkaline aqueous solution blended with a polymer latex which is insoluble in said aqueous solution, the proportions of soluble polymer to latex being 1-70% of soluble polymer to 30-99% of latex polymer on a solids basis.

18. The composition of claim 17 in which 1-25% of the soluble polymer acid 75-99% of the latex polymer is present in the blend.

19. The composition of claim 17 in which 1-15% of the soluble polymer and 85-99% of the latex polymer is present in the blend.

20. A method of coating a substrate comprising applying the composition of claim 17 to a substrate and curing the same.

21. An article prepared by the method of claim 20.

22. The polymer of claim 16 in the form of an alkaline aqueous solution combined with a latex the polymer of which is insoluble in said solution, the proportions of soluble polymer to latex polymer on a solids basis being from 1-70% of soluble polymer to 30-99% of latex polymer.

23. The blend of claim 22 in which 1-25% of the soluble polymer and 75-99% of the latex polymer is present in the blend.

24. The blend of claim 22 in which 1-15% of the soluble polymer and 85-99% of the latex polymer is present in the blend.

25. A method of coating a substrate comprising applying the composition of claim 22 to a substrate and curing the same.

26. An article prepared by the method of claim 25.

* * * * *

UNITED STATES PATENT AND TRADEMARK OFFICE
CERTIFICATE OF CORRECTION

PATENT NO. : 4,233,362
DATED : November 11, 1980
INVENTOR(S) : RONALD W. NOVAK and BENJAMIN B. KINE It is certified that error appears in the above-identified patent and that said Letters Patent are hereby corrected as shown below:

Column 11, line 49, "acrylonitjrile" should read --acrylonitrile--.

Column 12, line 65, "43/30/20/10" should read --40/30/20/10--.

Signed and Sealed this

Seventh Day of April 1981

[SEAL]

Attest:

RENE D. TEGTMEYER

*Attesting Officer*   *Acting Commissioner of Patents and Trademarks*